(12) United States Patent
Jeong et al.

(10) Patent No.: US 12,209,213 B2
(45) Date of Patent: Jan. 28, 2025

(54) ELECTRONIC ELEMENT WITH NANOMATERIAL AND MANUFACTURING METHOD THEREOF

(71) Applicant: RESEARCH & BUSINESS FOUNDATION SUNGKYUNKWAN UNIVERSITY, Suwon-si (KR)

(72) Inventors: Sohee Jeong, Seoul (KR); Hyekyoung Choi, Daejeon (KR); Youngsik Kim, Daejeon (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 102 days.

(21) Appl. No.: 17/425,501

(22) PCT Filed: May 4, 2020

(86) PCT No.: PCT/KR2020/005840
§ 371 (c)(1),
(2) Date: Jul. 23, 2021

(87) PCT Pub. No.: WO2020/226375
PCT Pub. Date: Nov. 12, 2020

(65) Prior Publication Data
US 2022/0081613 A1    Mar. 17, 2022

(30) Foreign Application Priority Data

May 8, 2019   (KR) .......................... 10-2019-0053556
Apr. 27, 2020  (KR) .......................... 10-2020-0050969

(51) Int. Cl.
C09K 11/70 (2006.01)
C01G 15/00 (2006.01)
(Continued)

(52) U.S. Cl.
CPC .............. *C09K 11/70* (2013.01); *C01G 15/00* (2013.01); *C01G 21/21* (2013.01); *C09K 11/661* (2013.01);
(Continued)

(58) Field of Classification Search
CPC ....... C09K 11/70; C09K 11/88; C09K 11/881; C09K 11/883
See application file for complete search history.

(56) References Cited

U.S. PATENT DOCUMENTS

2020/0343489 A1* 10/2020 Park ..................... H10K 50/115

FOREIGN PATENT DOCUMENTS

KR    2003-0035206 A    5/2003
KR    10-1480475 B1    1/2015
(Continued)

OTHER PUBLICATIONS

Wikipedia. Perovskite (structure). retrieved from: https://en.wikipedia.org/wiki/Perovskite_(structure) on Apr. 14, 2023 (Year: 2023).*
(Continued)

*Primary Examiner* — Matthew E. Hoban
(74) *Attorney, Agent, or Firm* — NSIP Law

(57) ABSTRACT

A nanomaterial includes quantum dots having a crystal structure, wherein the quantum dots include an exposed surface in a specific direction, and the exposed surface has a ligand bound thereto.

4 Claims, 16 Drawing Sheets

(51) Int. Cl.
*C01G 21/21* (2006.01)
*C09K 11/66* (2006.01)
*C09K 11/88* (2006.01)
*B82Y 20/00* (2011.01)
*B82Y 40/00* (2011.01)

(52) U.S. Cl.
CPC .............. *B82Y 20/00* (2013.01); *B82Y 40/00* (2013.01); *C01P 2004/04* (2013.01); *C01P 2004/30* (2013.01); *C01P 2004/64* (2013.01); *C01P 2006/60* (2013.01)

(56) References Cited

FOREIGN PATENT DOCUMENTS

KR 10-1557498 B1 10/2015
KR 10-2018-0070991 A 6/2018

OTHER PUBLICATIONS

Kim. Halide-Amine Co-Passivated Indium Phosphide Colloidal Quantum Dots in Tetrahedral Shape. Angew. Chem. Int. Ed. 2016, 55, 3714-3718 (Year: 2016).*

Woo. Ultrastable PbSe Nanocrystal Quantum Dots via in Situ Formation of Atomically Thin Halide Adlayers on PbSe(100). J. Am. Chem. Soc. 2014, 136, 25, 8883-8886 (Year: 2014).*

Peng. Mechanisms of the Shape Evolution of CdSe Nanocrystals. J. Am. Chem. Soc. 2001, 123, 1389-1395 (Year: 2001).*

Lim, et al. "Quantum dot surface engineering: Toward inert fluorophores with compact size and bright, stable emission.", *Coordination Chemistry Reviews*, 2016, (22 pages in English).

Ghosh, Sandeep, et al. "The Many "Facets" of Halide Ions in the Chemistry of Colloidal Inorganic Nanocrystals." *Chemical reviews* vol. 118 Issue 16, Jul. 2018: pp. 7804-7864. (61 pages in English).

Kim, Kyungnam, et al. "Halide-Amine Co-Passivated Indium Phosphide Colloidal Quantum Dots in Tetrahedral Shape." *Angewandte Chemie Int. Ed.* 55, vol. 128 Issue 11, Feb. 5, 2016: pp. 3714-3718. (5 pages in English).

Choi, Hyekyoung, et al. "Steric-Hindrance-Driven Shape Transition in PbS Quantum Dots: Understanding Size-Dependent Stability." *Journal of the American Chemical Society* vol. 135. Issue 14, Mar. 15, 2013: pp. 5278-5281. (4 pages in English).

Choi, Hyekyoung, et al. "Facet-Specific Ligand Interactions on Ternary AgSbS2 Colloidal Quantum Dots." *Chemistry—A European Journal* vol. 23 Issue 70, Sep. 7, 2017: pp. 17707-17713. (9 pages in English).

Clarke, Mitchell T., et al. "Synthesis of super bright indium phosphide colloidal quantum dots through thermal diffusion." *Communications Chemistry* vol. 2 Issue 1, Mar. 22, 2019: pp. 1-7. (7 pages in English).

Korean Office Action issued on Jan. 20, 2022 in corresponding Korean application No. 10-2020-0050969 (11 pages in Korean language).

* cited by examiner

[FIG. 1]
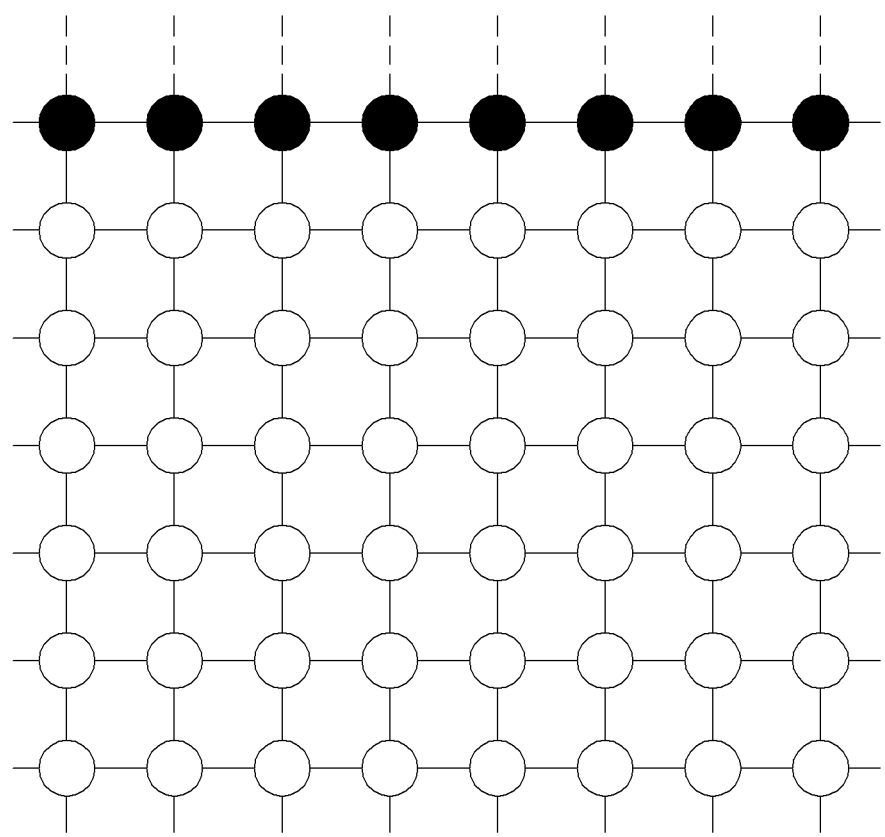

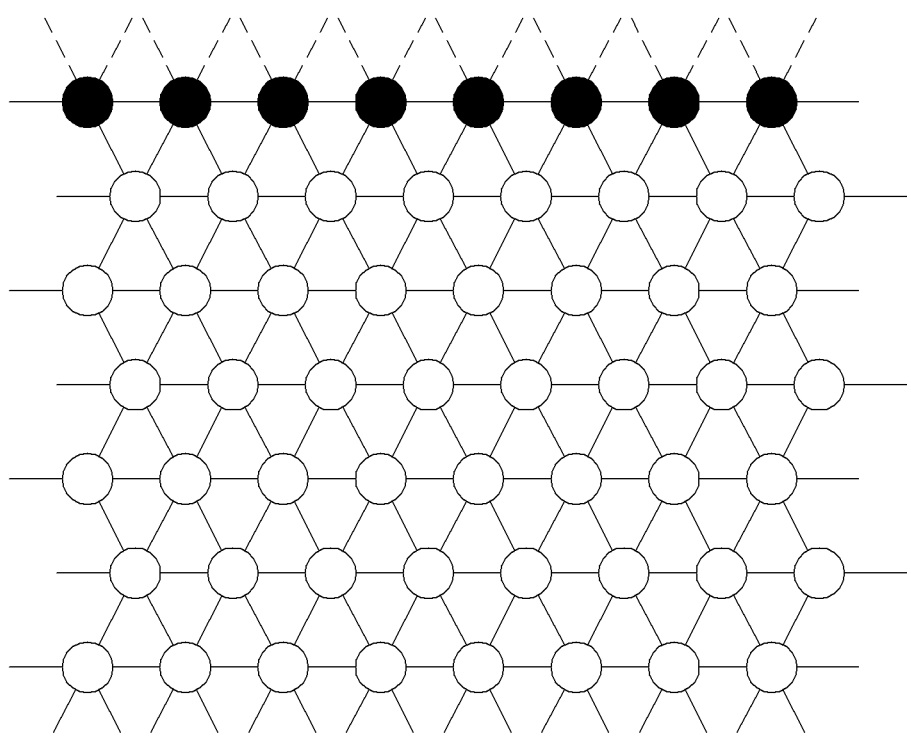
[FIG. 2]

[FIG. 3]
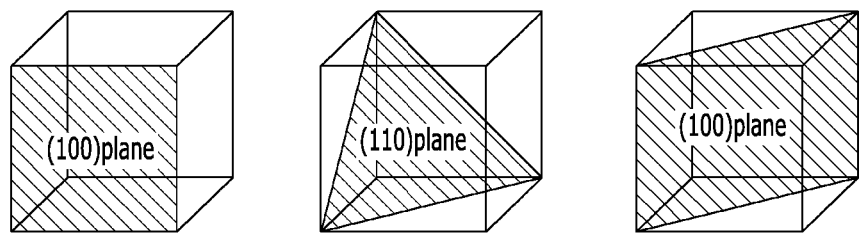

[FIG. 4]
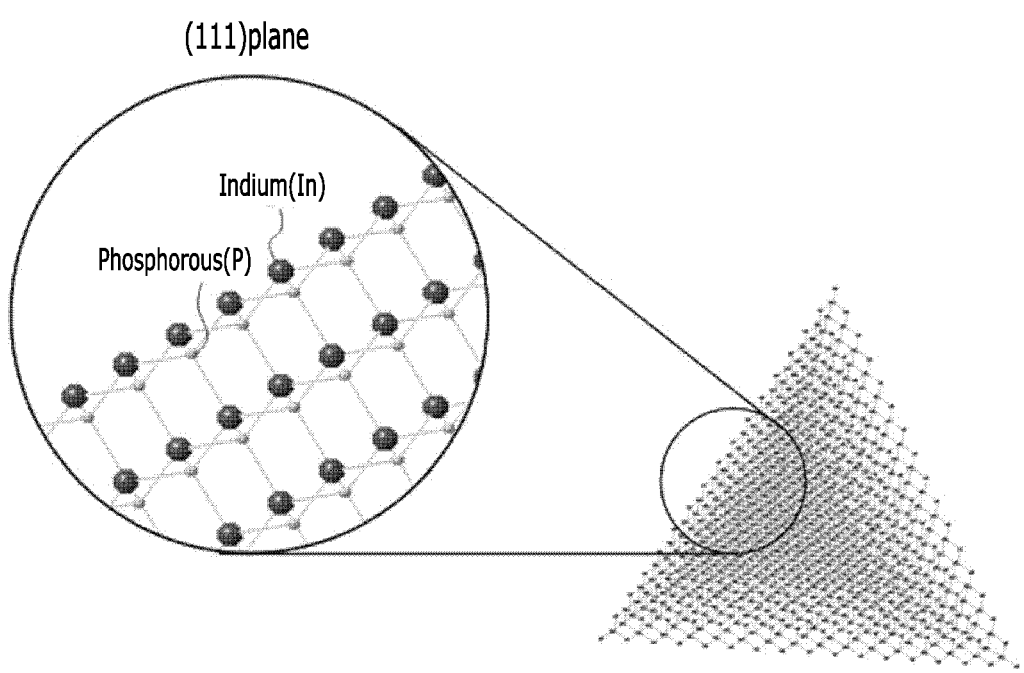

[FIG. 5]
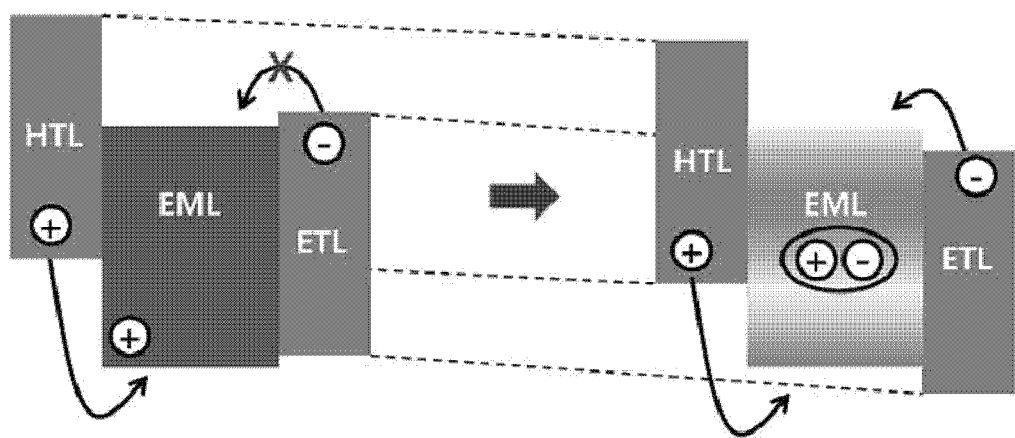

[FIG. 6]
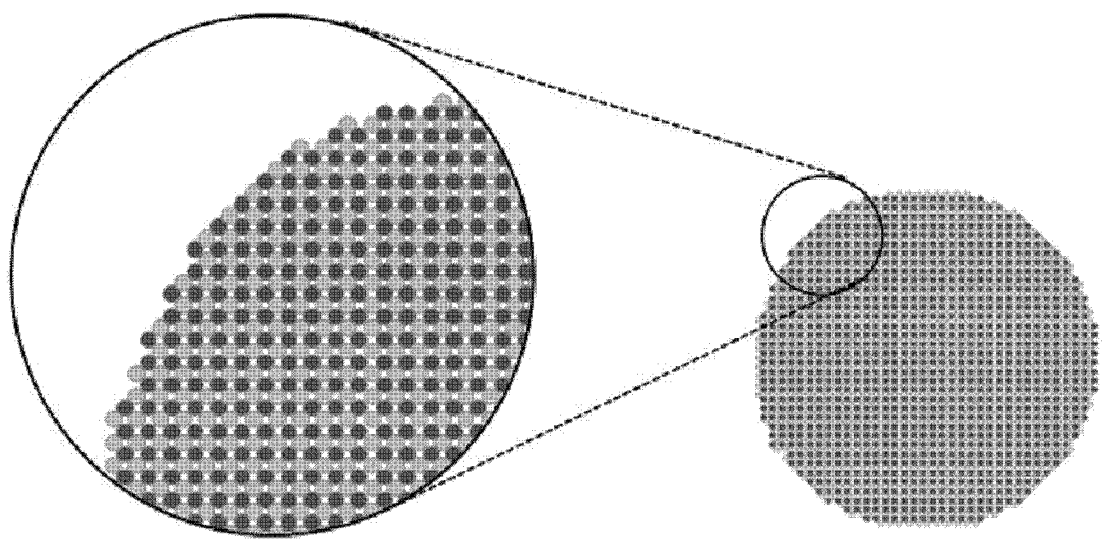

[FIG. 7]
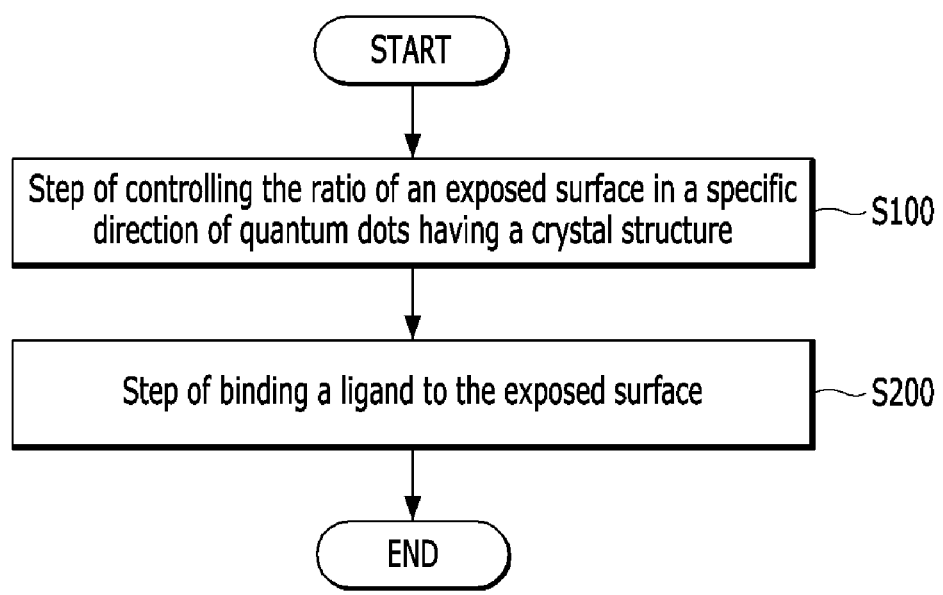

[FIG. 8]
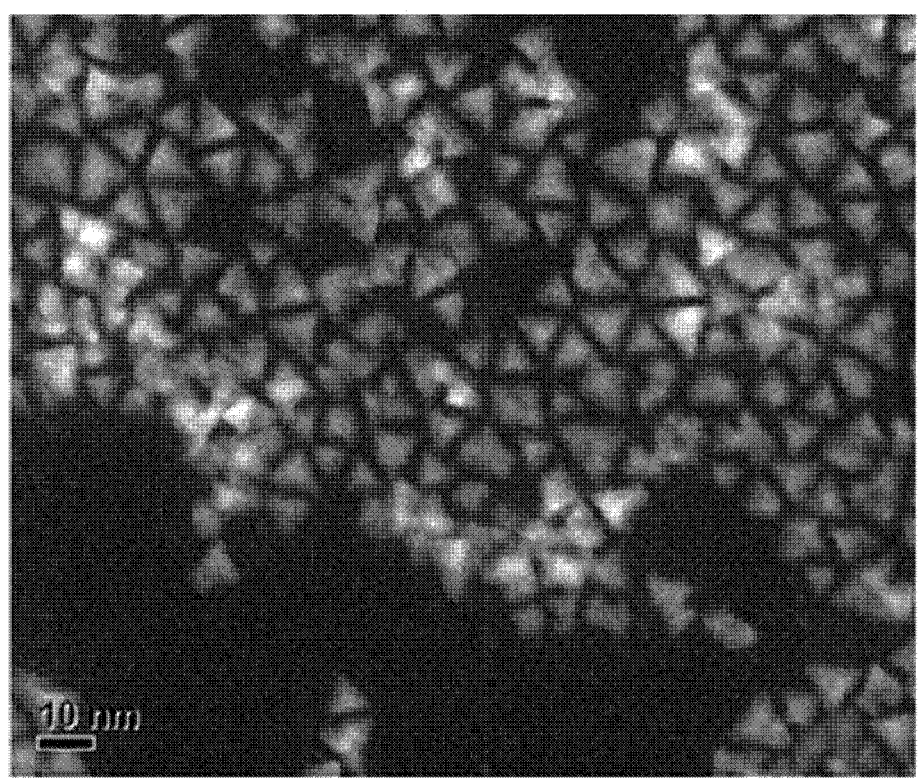

[FIG. 9]
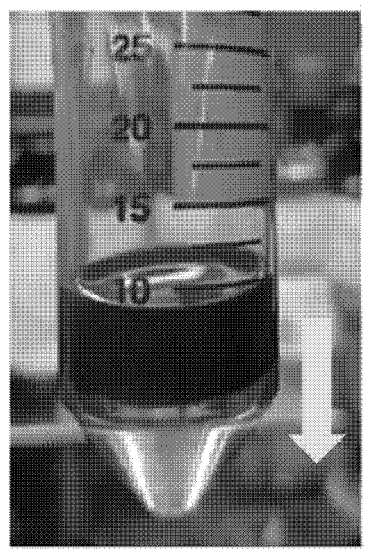 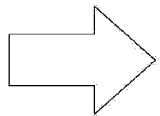 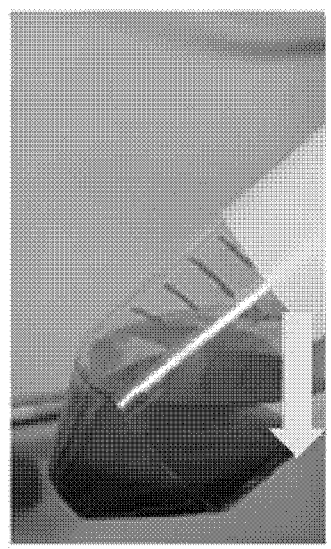
Before exchanging the ligand　　　　　After exchanging the ligand

[FIG. 10]
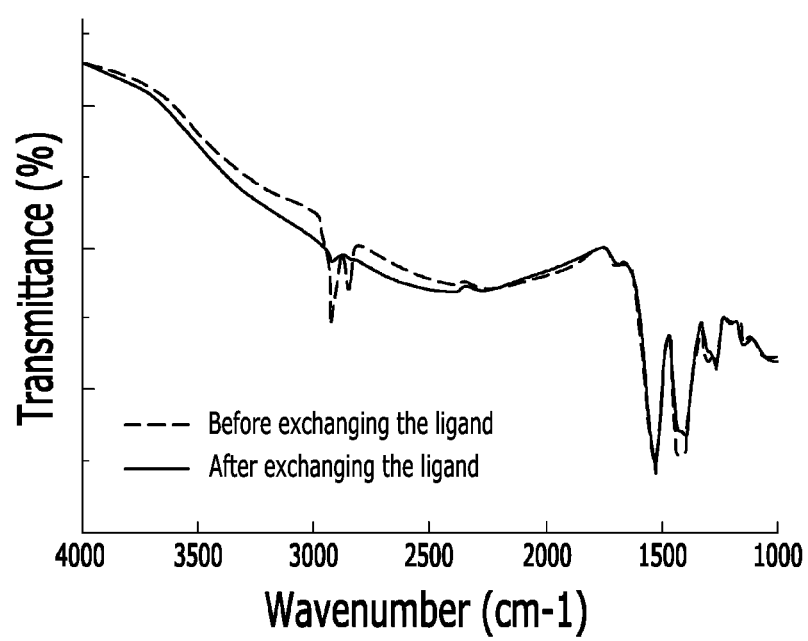

[FIG. 11]
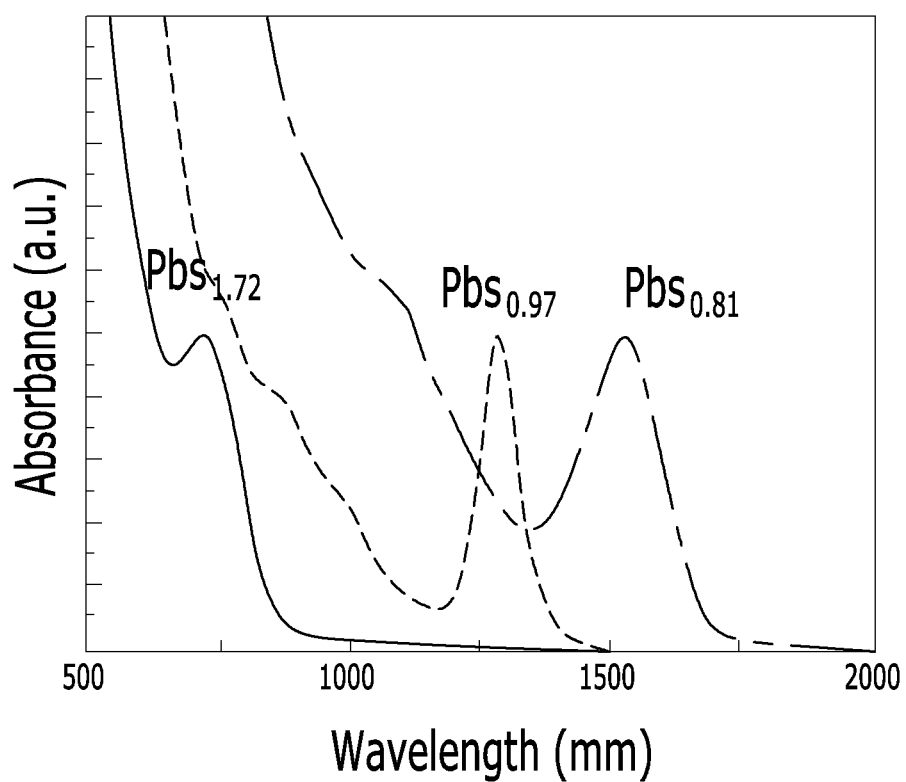

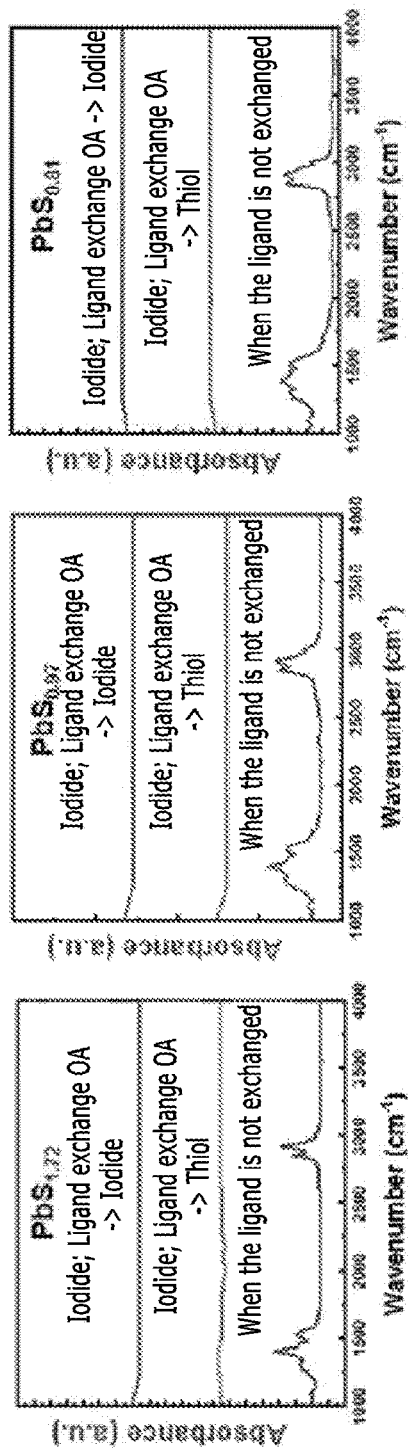
[FIG. 12]

[FIG. 13]
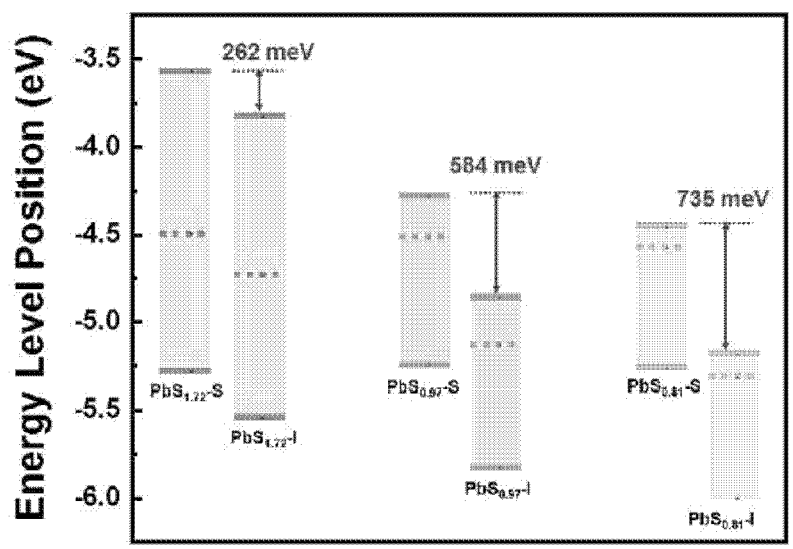

[FIG. 14]
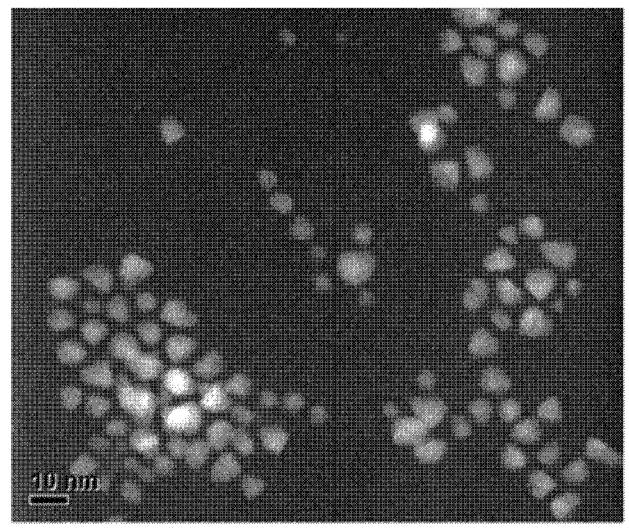

[FIG. 15]
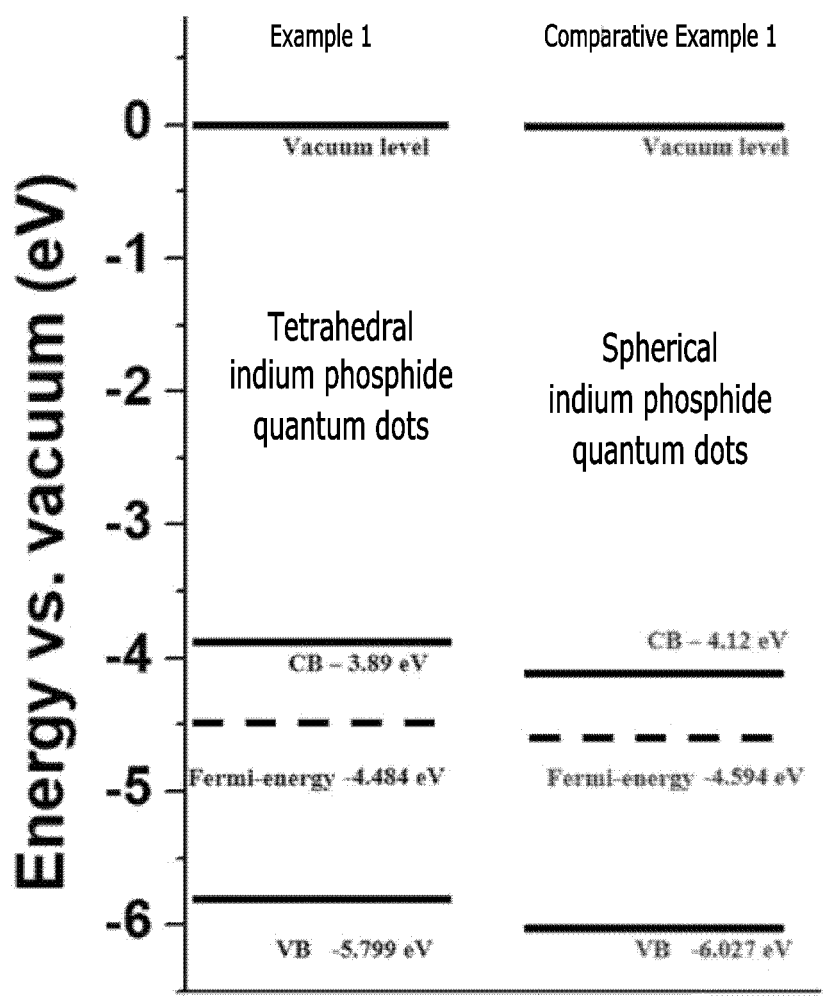

[FIG. 16]
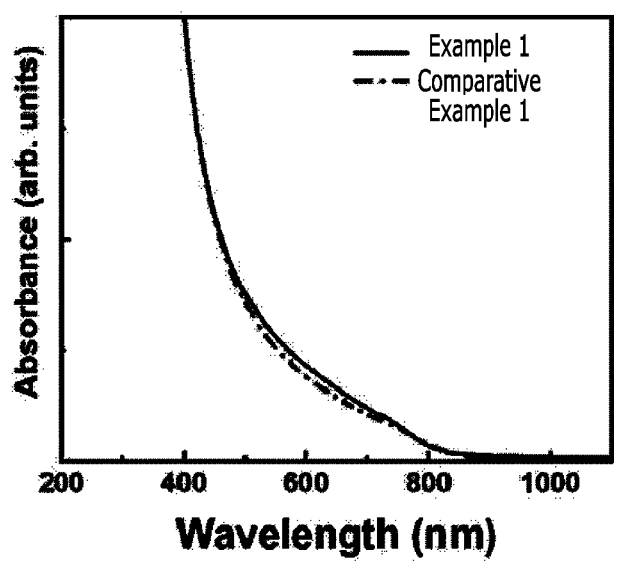

ELECTRONIC ELEMENT WITH NANOMATERIAL AND MANUFACTURING METHOD THEREOF

CROSS-REFERENCE TO RELATED APPLICATIONS

Pursuant to 35 USC 120 and 365(c), this application is a continuation of International Application No. PCT/KR2020/005840 filed on May 4, 2020, which claims the benefit under 35 USC 119(a) of Korean Patent Application No. 10-2019-5553556 filed on May 5, 2019, and Korean Patent Application No. 10-2020-0050969 filed on Apr. 27, 2020, in the Korean Intellectual Property Office, the entire disclosures of which are incorporated herein by reference for all purposes.

BACKGROUND

1. Field

The present application relates to a nanomaterial and a manufacturing method thereof.

2. Description of the Related Art

Quantum dots, as nanoparticles having a size of several tens of nanometers or less with semiconductor properties, have properties different from bulk particles due to the quantum confinement effect. Specifically, the bandgap varies depending on the size of the quantum dots so that absorbing wavelengths may be changed, and the quantum confinement effect due to their small size exhibits new optical, electrical, and physical properties which may not be seen in bulk materials. Therefore, research on technology for manufacturing a photoelectric conversion element, such as a solar cell or a light-emitting diode using such quantum dots, is being actively conducted.

Photoelectric/electro-optical element technologies using the quantum dots as described above have been developed in various ways. However, since there are great difficulties in increasing efficiency of elements and securing stability thereof due to the low efficiency of injecting or extracting electric charges into the quantum dots, a technique for adjusting the physical properties and energy levels of semiconductor nanomaterials including the quantum dots is desirable.

Since the semiconductor nanomaterials have a very large surface area compared to the volume of particles thereof, the physical properties of the materials may be adjusted by using changes in the surface environment.

Although a method of adjusting the energy level of the material by simply using an electronegativity difference between a ligand and a nanomaterial has conventionally been used, there is a limitation in types of the ligand that may be attached to the surface of the nanomaterial, and when different ligands are bound to the surface of the nanomaterial, differences in physical properties other than the energy level may occur, and there has been a problem that quantitative control of the energy level is impossible.

Korean Registered Patent No. 10-1557498, which is a background technology of the present application, relates to a quantum dot light-emitting material capable of adjusting the band level of the quantum dot light emitting layer by comprising a quantum dot light emitting layer having different organic ligand distributions on the surfaces in contact with the hole transport layer and the electron transport layer. However, the registered patent does not recognize that the energy level of quantum dots is quantitatively adjusted by controlling an exposed surface.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a nanomaterial includes quantum dots having a crystal structure, wherein the quantum dots include an exposed surface in a specific direction, and the exposed surface has a ligand bound thereto.

Energy level of the nanomaterial may be different depending on a ratio of the exposed surface or an amount of the ligand.

The energy level may be adjusted by an electronegativity difference between the exposed surface and the ligand.

The exposed surface may be selected from the group consisting of (111), (100), (110), and combinations thereof.

The exposed surface may consists of one component.

The ligand may include an ion or molecule selected from the group consisting of F, Cl, Br, I, 3-mercaptopropionic acid, ethanedithiol, and combinations thereof.

The quantum dots may have a structure selected from the group consisting of a regular tetrahedral structure, a cylindrical structure, a bar-shaped structure, a triangular structure, a disc-shaped structure, a tripod-shaped structure, a tetrapod-shaped structure, a cube-shaped structure, a box-shaped structure, a star-shaped structure, a tubular structure, a tetrahedral structure, an octahedral structure, and combinations thereof.

The quantum dots may include a quantum dot selected from the group consisting of indium phosphide (InP), lead sulfide (PbS), indium arsenide (InAs), indium antimonide (InSb), gallium arsenide (GaAs), gallium phosphide (GaP), gallium antimonide (GaSb), cadmium selenide (CdSe), cadmium sulfide (CdS), cadmium telluride (CdTe), zinc sulfide (ZnS), zinc selenide (ZnSe), zinc telluride (ZnTe), and combinations thereof.

In another general aspect, a manufacturing method of a nanomaterial, includes controlling a ratio of an exposed surface of quantum dots having a crystal structure in a specific direction, and binding a ligand to the exposed surface.

The manufacturing method my further include performing an operation of exchanging the ligand with other ligands.

The ligand may include an ion or molecule selected from the group consisting of an amine-based ligand, a thiol-based ligand, a phosphine-based ligand, a phosphine oxide-based ligand, and combinations thereof.

The other ligands may include a ligand selected from the group consisting of F, Cl, Br, I, 3-mercaptopropionic acid, ethanedithiol, and combinations thereof.

The ratio of the exposed surface may be controlled by adjusting a crystal's growth.

An electronic element may include the nanomaterial above.

An electronic element may include the nanomaterial, wherein energy level of the nanomaterial may be different depending on a ratio of the exposed surface or an amount of the ligand, and the energy level may be adjusted by an electronegativity difference between the exposed surface and the ligand.

An electronic element may include the nanomaterial, wherein the exposed surface may be selected from the group consisting of (111), (100), (110), and combinations thereof, and the exposed surface consist of one component.

An electronic element may include the nanomaterial, wherein the ligand includes an ion or molecule selected from the group consisting of F, Cl, Br, I, 3-mercaptopropionic acid, ethanedithiol, and combinations thereof.

An electronic element may include the nanomaterial, wherein the quantum dots have a structure selected from the group consisting of a regular tetrahedral structure, a cylindrical structure, a bar-shaped structure, a triangular structure, a disc-shaped structure, a tripod-shaped structure, a tetrapod-shaped structure, a cube-shaped structure, a box-shaped structure, a star-shaped structure, a tubular structure, a tetrahedral structure, an octahedral structure, and combinations thereof.

An electronic element may include the nanomaterial, wherein the quantum dots include a quantum dot selected from the group consisting of indium phosphide (InP), lead sulfide (PbS), indium arsenide (InAs), indium antimonide (InSb), gallium arsenide (GaAs), gallium phosphide (GaP), gallium antimonide (GaSb), cadmium selenide (CdSe), cadmium sulfide (CdS), cadmium telluride (CdTe), zinc sulfide (ZnS), zinc selenide (ZnSe), zinc telluride (ZnTe), and combinations thereof.

Other features and aspects will be apparent from the following detailed description, the drawings, and the claims.

BRIEF DESCRIPTION OF DRAWINGS

FIG. 1 is a schematic diagram of an example of a random crystal structure for illustrating a nanomaterial.

FIG. 2 is a schematic diagram of another example of a random crystal structure for illustrating a nanomaterial.

FIG. 3 is a schematic diagram of examples illustrating (100), (111), and (110) planes in a face centered cubic (FCC) crystal structure for explaining a nanomaterial.

FIG. 4 is a schematic diagram of an example of quantum dots included in a nanomaterial.

FIG. 5 is a conceptual diagram for an example of energy level adjustment of a nanomaterial.

FIG. 6 is a nanomaterial according to a comparative example of the present application.

FIG. 7 is a flowchart of an example of a manufacturing method of a nanomaterial.

FIG. 8 is a transmission electron microscope (TEM) image of tetrahedral InP quantum dots according to an example of the present application.

FIG. 9 is photographs before and after exchanging the ligand of a nanomaterial according to an example of the present application.

FIG. 10 is spectroscopic analysis (FT-IR) results of a nanomaterial according to an example of the present application.

FIG. 11 is other spectroscopic analysis (FT-IR) results of a nanomaterial according to an example of the present application.

FIG. 12 is another spectroscopic analysis (FT-IR) results of a nanomaterial according to an example of the present application.

FIG. 13 is ultraviolet photoelectron spectroscopy (UPS) analysis results of a nanomaterial according to an example of the present application.

FIG. 14 is a TEM image of spherical InP quantum dots according to a comparative example of the present application.

FIG. 15 shows an energy level difference between nanomaterials according to an example and a comparative example of the present application.

FIG. 16 is an absorbance graph according to wavelengths of light of nanomaterials according to an example and a comparative example of the present application.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above"

or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

When unique manufacture and material allowable errors of numerical values are suggested to mentioned meanings of terms of degrees used in the present specification such as "about", "substantially", etc., the terms of degrees are used in the numerical values or as a meaning near the numerical values, and the terms of degrees are used to prevent that an unscrupulous infringer unfairly uses a disclosure content in which exact or absolute numerical values are mentioned to help understanding of the present application. Further, in the whole specification of the present application, "a step to do ~" or "a step of ~" does not mean "a step for ~".

In the whole specification of the present application, a term of "a combination thereof" included in a Markush type expression, which means a mixture or combination of one or more selected from the group consisting of elements described in the Markush type expression, means including one or more selected from the group consisting of the elements.

Hereinafter, a nanomaterial according to the present application and a manufacturing method thereof will be described in detail with reference to embodiments, examples, and drawings. However, the present application is not limited to such embodiments, examples, and drawings.

A nanomaterial according to the present application may have a different surface energy depending on which direction a crystal plane (exposed surface) is selected as the surface of the crystal even if it is a crystal formed of the same material.

A ligand may be bound to the exposed surface of a nanomaterial. As the ligand is bound to the exposed surface, the energy level of the nanomaterial may be changed due to the electronegativity difference.

Since the different exposed surfaces have different surface energies as described above, amounts of the ligand attached to the exposed surfaces in different directions are different even when the same type of ligand is used.

Thus, a nanomaterial according to the present application may control the exposed surface so that the exposed surface has a specific direction, and may adjust the amounts of the ligand attached accordingly so that the energy level of the nanomaterial may be quantitatively adjusted.

Since a nanomaterial according to the present application may quantitatively control the energy level, the nanomaterial may solve a balance problem of injection and extraction of electric charges and holes when applied to an electro-optical/photoelectric element by enabling the energy level to be fine-tuned.

In an example for achieving the above-mentioned technical tasks, the first aspect of the present application provides a nanomaterial comprising quantum dots having a crystal structure. The quantum dots include an exposed surface in a specific direction, and the exposed surface has a ligand bound thereto.

In the present application, the exposed surface (facet), as a crystallographic plane (crystal plane), refers to the surface of a nanomaterial, and the term exposed surface may be used interchangeably with a surface or a crystal plane. Further, the exposed surface has a specific crystal plane direction, and the crystal plane direction is expressed as a Miller index.

The Miller index is a technique of expressing a crystal direction ([uvw]) or a crystal plane ((hkl)). If sizes of lattice constants a, b, and c of a crystal are the same, and angles formed by an a-axis, a b-axis, and a c-axis of the crystal are the same as 90°, a <uvw> crystal direction group means a set of crystal directions selected from the group consisting of [uvw], [uv-w], [u-vw], [u-v-w], [-uvw], [-uv-w], [-uvw], [-u-v-w], and combinations thereof, and the <uvw> crystal direction group may be the same as <uwv>, <vuw>, <vwu>, <wuv>, and <wvu> crystal direction groups.

Further, the Miller index expresses the crystal plane ((hkl)) on the crystal structure as a direction. A {hkl} crystal plane group means a set of crystal planes selected from the group consisting of (hkl), (hk-l), (h-kl), (h-k-l), (-hkl), (-hk-l), (-h-kl), (-h-k-l), and combinations thereof. The {hkl} crystal plane group may be the same as {hlk}, {khl}, {klh}, {lhk}, and {lkh} crystal plane groups. Further, if u=h, v=k, and w=l are established in [uvw] and (hkl), the (hkl) plane means to be perpendicular to the [uvw] direction.

For example, a plane perpendicular to the <110> crystal direction may include planes perpendicular to the [110], [101], or [011] crystal direction, i.e., (110), (101), (011), (-1, 1, 0), (-1, 0, 1), (0, -1, 1), (1, -1, 0), (1, 0, -1), and (0, 1, -1) planes.

In this regard, unless otherwise stated in the present application, the description of (h,k,l) or [u,v,w] means a Miller index (uvw) of the crystal plane or a Miller index [uvw] of the crystal direction.

FIG. 1 is a schematic diagram of an example of a random crystal structure illustrating a nanomaterial according to the present application.

In the crystal structure of FIG. 1, internal atoms form four bonds (solid lines) along with surrounding atoms, and outermost layer atoms (atoms present in the cross section of the crystal structure) form three bonds (solid lines) along with the surrounding atoms, and have one dangling bond which may not be bonded. In order to allow atoms to be bonded therebetween, specific energy (the magnitude of energy is different for each type of atom) is required, and the energy is referred to as binding energy. The one dangling bond has extra energy capable of additionally bonding to one atom. Since the extra energy has one for each of the outermost layer atoms, it exists as many as the number of the outermost layer atoms existing on the surface when viewed as a whole of the crystalline material.

FIG. 2 is a schematic diagram of another example of a random crystal structure illustrating a nanomaterial according to the present application.

In the crystal structure of FIG. 2, internal atoms form six bonds (solid lines) along with surrounding atoms, and outermost layer atoms form four bonds and have two dangling bonds. Compared to the crystal of FIG. 1, the crystal of FIG. 2 has higher surface energy since more dangling bonds are present in the cross-section of the crystal of FIG. 2. As described above, the basic principle by which the difference in surface energy occurs may be seen through FIGS. 1 and 2.

Further, since the angle or direction in which atoms are bonded is different (that is, the direction of the crystal plane is different) depending on which direction a cross-section (crystal plane) is formed in which the crystal is viewed not only when the crystal structures are different as in FIGS. 1 and 2, but also within the same crystal structure, the dangling bonds in the unbonded state exist in different states depending on the cross-section even in the same crystal, and the surface energy is different for each cross-section accordingly. Even if crystals are formed of the same material, crystals having different crystal planes on their surfaces have different surface energies.

According to this principle, a nanomaterial, according to the present application, may have different surface energies depending on which direction the surface of the quantum dot crystal has a crystal plane, even if it includes a quantum dot crystal formed of the same element.

According to an embodiment of the present application, although the exposed surface may be selected from the group consisting of (111), (100), (110), and combinations thereof, it is not limited thereto.

Although examples in FIG. 3 illustrates (100), (111), and (110) planes in a face centered cubic (FCC) crystal structure to explain a nanomaterial according to the present application. A nanomaterial according to the present application is not limited thereto and may have various crystal structures in addition to the FCC crystal structure, and may have various crystal planes in addition to the (100), (111), and (110) planes.

For example, when a nanomaterial, according to the present application, includes quantum dots having a zinc blende structure, (111), (110), and (100) planes formed as an exposed surface on the quantum dots may each have the following characteristics.

The (111) plane is a plane to which only one type of atom among positively charged atoms or negatively charged atoms is exposed, and a positively or negatively charged ligand may be bound to the (111) plane. The surface energy to which the ligand is bound may differ from the surface energy to which the ligand is not bound.

Since self passivation easily occurs in the (110) plane, for example, as a plane to which both positively charged atoms and negatively charged atoms are exposed, the (110) plane may have a property that the ligand is not attached well thereto. This may vary depending on the crystal structure.

Although the (100) plane is, for example, a plane to which only one of positively charged atoms or negatively charged atoms is exposed as in the (111) plane, it may be energetically more unstable than the (111) plane since the (100) plane has two dangling bonds per one atom when the (100) plane is exposed differently from the (111) plane.

However, properties of such (111), (110), and (100) planes may vary depending on the crystal structure of the quantum dots, and are not limited to the properties described above.

In this regard, as will be described later, a nanomaterial, according to the present application, may adjust the crystal direction or atomic composition of the exposed surface by adjusting the growth degree of a crystal.

FIG. 4 is a view showing an example of quantum dots included in a nanomaterial according to an embodiment of the present application, in which a tetrahedral indium phosphide (InP) is formed, and FIG. 4 exemplarily shows that all four surfaces (exposed surfaces) of the tetrahedron are controlled as (111) planes.

According to an embodiment of the present application, although the exposed surface may be formed of only one component, it is not limited thereto.

Referring to FIG. 4, it may be confirmed that only indium is exposed on the surface of the tetrahedral indium phosphide. As described above, the (111) plane to which only indium is exposed may be easily bound to a ligand having a negative charge.

The nanomaterial is not limited to the nanomaterial illustrated in FIG. 4. For example, even if the nanomaterial is a nanomaterial that includes indium phosphide quantum dots equally as in FIG. 4, only indium (In) or phosphorus (P) may be allowed to exist on the crystal plane, or indium and phosphorus may be adjusted to be exposed in the same ratio, and the composition of the exposed surface is not limited thereto.

That is, the surface of a nanomaterial, according to the present application, is controlled to have an exposed surface in a specific direction, and the exposed surface in a different direction has a different composition of atoms exposed onto the exposed surface.

According to an embodiment of the present application, although the energy level may differ depending on the ratio of the exposed surface or the amount of the bound ligand, it is not limited thereto.

The surface energy of the exposed surface itself is different depending on which direction it has. Moreover, whether the ligand may be bound, the binding amount of the ligand, and the binding strength of the ligand are different. Since a nanomaterial, according to the present application, may control the exposed surface, the nanomaterial may be designed according to the purpose by predicting binding to the ligand.

Accordingly, the nanomaterial enables the energy level of the nanomaterial to be finely adjusted by predicting and quantitatively adjusting the binding amount of the ligand and the binding strength of the ligand on the exposed surface.

As described above, since the different exposed surfaces have different surface energies so that the amounts of the ligand bound to the exposed surfaces in different directions are different even when the same type of ligand is used, a nanomaterial according to the present application may adjust energy by adjusting the binding amount of the ligand using one type of ligand.

FIG. 5 is a conceptual diagram for an example of energy level adjustment of a nanomaterial according to an embodiment of the present application.

Referring to FIG. 5, the figure to the left of the arrow indicates that a light emission layer (EML) does not generate light as holes injected into the hole transport layer (HTL) and electrons injected into the electron transport layer (ETL) are not smoothly transported. The figure to the right of the arrow indicates that the EML generates light as the energy levels of the HTL and the ETL are properly adjusted so that the holes and the electrons are transported smoothly. In order to generate light as described above, it is essential to finely adjust the energy levels of the HTL and ETL.

It is typically difficult to finely adjust the energy levels in the related art since it may be necessary to change the HTL or the ETL to a crystalline material having a different energy level or to change the type of ligand bound to the crystalline material to adjust the energy levels of the HTL and the EML.

On the other hand, according to the present application, a nanomaterial enables binding (amount, strength, etc.) between the exposed surface and the ligand to be adjusted by controlling the exposed surface of a quantum dot crystalline material composed of the same element.

Moreover, since the energy level of the nanomaterial may be adjusted by adjusting the binding amount of the ligand, the energy level of the nanomaterial may be changed depending on the binding amount of the ligand, even when the same type of ligand is used without changing the type of the ligand. Accordingly, it is easy to predict and quantitatively adjust the energy level of the nanomaterial according to ligand binding.

Since a nanomaterial, according to the present application, may control the exposed surface so that it is possible to fine-tune the energy level, a problem of balancing injection and extraction of electric charges and holes may be solved when it is applied to an electro-optical/photoelectric element.

The adjustable energy level in a nanomaterial according to the present application includes an energy level of a valence band and/or an energy level of a conduction band.

Desirably, a nanomaterial of the present application allows the size of a band gap between the valence band and the conduction band to be maintained without being significantly changed.

Referring to FIG. 5, a nanomaterial according to the present application may facilitate the transport of electrons and holes while maintaining a specific band gap by changing the energy levels of the valence band and the conduction band at the same time.

FIG. 6 is a nano-material according to a comparative example of the present application, in which spherical indium phosphide (InP) is formed. As the surface of the spherical indium phosphide is not controlled, it is indicated that an exposed surface in a specific direction does not exist. In this way, when the exposed surface is not controlled, the above-described effects of a nanomaterial according to the present application may not be obtained.

According to an embodiment of the present application, although the ligand may include a ligand selected from the group consisting of F, Cl, Br, I, 3-mercaptopropionic acid, ethanedithiol, and combinations thereof, it is not limited thereto. The ligand may include thiol, amine, fatty acid, etc. in addition to the above examples.

In this regard, since a nanomaterial including a ligand having an excessively long chain may impede injection of the holes and electrons when implemented in an element, it is desirable that a ligand having a short chain is used as the ligand.

According to an embodiment of the present application, although the energy level may be adjusted by an electronegativity difference between the exposed surface and the ligand, it is not limited thereto.

In this regard, since a nanomaterial according to the present application may enable the binding strength with the quantum dot crystal to be adjusted depending on the type of the ligand, the energy level of the nanomaterial may also be changed depending on the type of the ligand.

According to an embodiment of the present application, although the quantum dots may have a structure selected from the group consisting of a regular tetrahedral structure, a cylindrical structure, a bar-shaped structure, a triangular structure, a disc-shaped structure, a tripod-shaped structure, a tetrapod-shaped structure, a cube-shaped structure, a box-shaped structure, a star-shaped structure, a tubular structure, a tetrahedral structure, an octahedral structure, and combinations thereof, they are not limited thereto.

According to an embodiment of the present application, although the quantum dots may include a quantum dot selected from the group consisting of indium phosphide (InP), lead sulfide (PbS), indium arsenide (InAs), indium antimonide (InSb), gallium arsenide (GaAs), gallium phosphide (GaP), gallium antimonide (GaSb), cadmium selenide (CdSe), cadmium sulfide (CdS), cadmium telluride (CdTe), zinc sulfide (ZnS), zinc selenide (ZnSe), zinc telluride (ZnTe), and combinations thereof, they are not limited thereto.

A second aspect of the present application provides a manufacturing method of a nanomaterial, the manufacturing method comprising the steps of: controlling the ratio of an exposed surface in a specific direction of quantum dots having a crystal structure; and binding a ligand to the exposed surface.

With respect to the manufacturing method of the nanomaterial according to the second aspect of the present application, although detailed descriptions of parts overlapping with the first aspect of the present application have been omitted, the contents described in the first aspect of the present application may be equally applied to the second aspect of the present application even if the descriptions have been omitted.

FIG. 7 is a flowchart of a manufacturing method of a nanomaterial according to an embodiment of the present application.

First, the ratio of the exposed surface in a specific direction of quantum dots having a crystal structure is controlled (S100).

Subsequently, a ligand is bound to the exposed surface (S200).

A nanomaterial according to the present application may be manufactured by, for example, a colloidal nanoparticle synthesis method, in which nanocrystals (quantum dots) are synthesized in a solution phase, and a ligand having a long chain should be used to maintain the nano size. If a ligand having a short chain is used in the crystal growth process, there is a problem in that it may be grown in bulk without maintaining the nano size.

When the crystal grows, one or more ligands may be used as the ligand. For example, it is also possible to use oleylamine and chloride (Cl) ligands at the same time.

According to an embodiment of the present application, although the process of exchanging the ligand with other ligands may be additionally performed, it is not limited thereto.

According to an embodiment of the present application, although the ligand may include a ligand selected from the group consisting of an amine-based ligand, a thiol-based ligand, a phosphine-based ligand, a phosphine oxide-based ligand, and combinations thereof, it is not limited thereto. Desirably, the oleylamine ligand may be used.

According to an embodiment of the present application, although the other ligands may include a ligand selected from the group consisting of F, Cl, Br, I, 3-mercaptopropionic acid, ethanedithiol, and combinations thereof, it is not limited thereto.

The nanomaterial manufactured by exchanging the ligand having the long chain with the ligand having the short chain may facilitate injection of holes and electrons without being disturbed by the ligand when it is applied to an element.

According to an embodiment of the present application, although the ratio of the exposed surface in a specific direction of the quantum dots having the crystal structure may be controlled by adjusting the growth of the crystal, it is not limited thereto.

When nanocrystals grow, they tend to grow in a direction in which the total energy (Gibbs energy) decreases. Therefore, as the nanocrystals are grown while forming a surface with low surface energy under normal conditions, it is difficult to control the exposed surface as desired.

Accordingly, a manufacturing method of a nanomaterial according to the present application may control the exposed surface as desired by adjusting the growth of the quantum dot crystal through a method of stabilizing the surface energy by binding an arbitrary ligand to a surface which is wanted to be exposed and destabilizing the surface energy by binding an arbitrary ligand to a surface which is not wanted to be exposed while supplying a monomer, which is a constituent material of the quantum dots, at a rate slower than the reaction rate of the surface of growing quantum dots in the process of growing the quantum dots, a method of using a steric effect according to ligand binding, temperature control, etc.

A third aspect of the present application provides an electronic element comprising a nanomaterial according to the first aspect of the present application.

With respect to an electronic element according to the third aspect of the present application, although detailed descriptions of parts overlapping with the first aspect and/or the second aspect of the present application have been omitted, the contents described in the first aspect and/or the second aspect of the present application may be equally applied to the third aspect of the present application even if the descriptions have been omitted.

The above-described problem solving means are merely exemplary, and should not be construed as an intention of limiting the present application. In addition to the exemplary embodiments described above, additional embodiments may exist in the drawings and detailed description of the invention.

Although the present disclosure will be described in more detail through the following examples, the following examples are for illustrative purposes only and are not intended to limit the scope of the present application.

[Example 1] Manufacturing of Indium Phosphide (InP) Nanomaterial with Controlled Exposed Surface <1-1. Manufacturing of Tetrahedral Indium Phosphide (InP) Quantum Dots>

In order to prepare tetrahedral indium phosphide with an exposed surface composed of (111), 0.24 g of indium chloride (InCl$_3$) and 5 ml of oleylamine were put into a three-neck flask, and maintained at a temperature of 140° C. in a vacuum atmosphere for 1 hour. Subsequently, after converting the vacuum atmosphere to a nitrogen atmosphere, raising the temperature to a temperature of 250° C., mixing 0.18 ml of tris(dimethylamino)phosphine with 0.5 ml of an oleylamine solution to obtain a mixed solution, injecting the mixed solution, and performing a reaction process for 1 hour, the reaction process was terminated. At this time, the particles were grown, and the (111) plane with a small surface energy was exposed to lower the Gibbs energy so that tetrahedral quantum dots were formed. After cooling a reaction-completed solution in the flask to room temperature, indium phosphide quantum dots were manufactured by separating the cooled solution by precipitation with 5 ml of hexane and 35 ml of acetone.

Since the formed tetrahedral InP quantum dots are mainly exposed to In atoms, the energy level may be changed more significantly through an additional ligand exchange reaction.

FIG. 8 is a transmission electron microscope (TEM) image of tetrahedral InP quantum dots manufactured according to Example 1.

<1-2. Ligand Exchange Reaction>

In order to exchange ligands in the manufactured quantum dots, after adding 3 ml of a 0.6 M solution in which 4 ml of hexane and InCl$_3$ were dispersed in dimethylformamide to 1 ml of a solution dispersed at a concentration of 0.01 g/ml, the solutions were vigorously shaken.

FIG. 9 depicts photographs before and after exchanging the ligand of a nanomaterial according to an example of the present application, wherein it may be confirmed that InP quantum dots to which an oleylamine ligand was bound before exchanging the ligand are dispersed in hexane, a non-polar solvent, and are present in the upper layer, and InP quantum dots after being substituted with the Cl ligand after exchanging the ligand are dispersed in dimethylformamide, a polar aprotic solvent, and are present in the lower layer.

FIG. 10 is spectroscopic analysis (FT-IR) results of a nanomaterial according to an example of the present application.

Referring to FIG. 10, it may be confirmed that the ligand (oleylamine) before exchanging the ligand is completely removed from the nanomaterial manufactured in the above example.

Specifically, it may be confirmed that a spectrum of C—H of oleylamine seen in the 3,000 wavenumber region before the ligand exchange reaction disappeared after the ligand exchange reaction, and it may be confirmed through this that the oleylamine ligand before exchanging the ligand was replaced with Cl.

[Example 2] Manufacturing of Lead Sulfide (PbS) Nanomaterial with Controlled Exposed Surface <2-1. Manufacturing of Lead Sulfide (PbS) Quantum Dots>

In order to synthesize a lead sulfide nanomaterial with a controlled exposed surface, 1.13 g (2.98 mmol) of lead acetate trihydrate, 2.1 ml (6.65 mmol) of oleic acid, and 30 ml of 1-octadecene (ODE) were put into a three-neck flask.

After removing moisture and other impurities at a temperature of 110° C. in a vacuum atmosphere for 5 hours, and changing the vacuum atmosphere to a nitrogen atmosphere, the temperature was set to a reaction temperature (70° C. to 170° C.) suitable for the desired size. At this time, the higher the reaction temperature, the larger the particles could be synthesized.

After injecting a solution in which 0.158 ml of bis(trimethylsilyl)sulfide and 5 ml of octadecene were mixed at each reaction temperature, and secondly and thirdly injecting the solution in which 0.158 ml of bis(trimethylsilyl)sulfide and 5 ml of octadecene were mixed when the temperature that had been dropped along with the injection rose back to the reaction temperature, the reaction was terminated.

The synthesized solution was separated by precipitation by adding an antisolvent such as methanol or acetone.

Quantum dots having three different particle sizes were synthesized according to the above method ($PbS_{1.72}$; a bandgap of 1.72 eV, $PbS_{0.97}$; a bandgap of 0.97 eV, and $PbS_{0.81}$; a bandgap of 0.81 eV).

FIG. 11 is spectroscopic analysis (FT-IR) results of the PbS quantum dots according to Example 2(2-1).

It may be confirmed through FIG. 11 that the ratio of 111 planes (Pb-rich) increases as the band gap of the PbS quantum dots increases, and the ratio of (100) planes (Pb and S are close to 1:1) increases as the band gap of the PbS quantum dots decreases.

<2-2. Ligand Exchange Reaction>

An oleic acid (OA) ligand was exchanged with iodide (I) and thiol ligand by performing a ligand exchange reaction in the same manner as in Example 1(1-2).

FIG. 12 is spectroscopic analysis (FT-IR) results before and after the ligand exchange reaction for PbS quantum dots ($PbS_{1.72}$, $PbS_{0.97}$, $PbS_{0.81}$) according to Example 2(2-1).

Referring to FIG. 12, it may be seen that all of oleic acid that is the existing ligand has been removed through this since the peak (C—H signal) near 1,500 $cm^{-1}$ and 3,000 $cm^{-1}$ disappeared in the FT-IR spectrum after exchanging oleic acid (OA) ligands with iodide (I, blue) and thiol (S, red) ligands in the three types of PbS quantum dots.

FIG. 13 is ultraviolet photoelectron spectroscopy (UPS) analysis results of the PbS nanomaterial according to Example 2(2-2).

Referring to FIG. 13, the degree of change in the energy level according to the ratio of the exposed surface of the quantum dots may be confirmed after performing ligand exchange. Specifically, when S binds as a ligand and when I binds as a ligand, it may be seen that the width of change in energy level is not large in the case of $PbS_{1.72}$, whereas the width of change in energy level due to different ligands is large in the case of $PbS_{0.81}$. Through this, it may be seen that the difference in the degree of energy level change increases even if the same ligand is attached depending on the exposed surface.

[Comparative Example 1] Manufacturing of Indium Phosphide (InP) Nanomaterial with Uncontrolled Exposed Surface 1-1. Manufacturing of Spherical Indium Phosphide (InP) Quantum Dots In order to synthesize spherical indium phosphide quantum dots, 0.24 g of indium chloride ($InCl_3$) and 5 ml of oleylamine were put into a three-neck flask and maintained at a temperature of 140° C. in a vacuum atmosphere for 1 hour. Subsequently, after converting the vacuum atmosphere to a nitrogen atmosphere, raising the temperature to a temperature of 250° C., mixing 1.26 ml of tris(dimethylamino)phosphine with 0.5 ml of an oleylamine solution to obtain a mixed solution, injecting the mixed solution, and performing a reaction process for 1 hour, the reaction process was terminated. After cooling a reaction-completed solution in the flask to room temperature, spherical indium phosphide quantum dots were finally obtained by separating the cooled solution by precipitation with 5 ml of hexane and 35 ml of acetone.

FIG. 14 is a TEM image of spherical InP quantum dots according to Comparative Example 1 of the present application.

1-2. Ligand Exchange

After adding 3 ml of a 0.6 M solution in which 4 ml of hexane and $InCl_3$ were dispersed in dimethylformamide to 1 ml of a solution in which the nanomaterial manufactured in Comparative Example 1-1 was dispersed ata concentration of 0.01 g/ml, the solutions were vigorously shaken.

Experimental Example 1

Ultraviolet Photoelectron Spectroscopy (UPS) analysis was performed on the nanomaterials of Example 1 and Comparative Example 1.

FIG. 15 shows an energy level difference between the nanomaterial according to Example 1 and the nanomaterial according to Comparative Example 1 of the present application.

Referring to FIG. 15, it may be seen that tetrahedral and spherical InP quantum dots having the same bandgap have different energy levels after ligand exchange. This occurs due to differences in changes of the coverage, binding force, dipole due to the binding force, etc. of the ligand and the quantum dots depending on the exposed surface.

Experimental Example 2

The absorbance according to wavelengths of light was analyzed for Example 1 and Comparative Example 1.

FIG. 16 is an absorbance graph according to wavelengths of light of the nanomaterials according to Example 1 and Comparative Example 1 of the present application.

Referring to FIG. 16, it may be seen that the band gaps of Example 1 and Comparative Example 1 are almost similar since the shape of the spectrum from the point where the absorption starts to thereafter is similar. An optical band gap was obtained through the absorbance graph of FIG. 16, and a point at which absorption occurred or a point at which absorption peak appeared was defined as a band gap.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A manufacturing method of a nanomaterial comprising quantum dots, the manufacturing method comprising:

controlling a ratio of an exposed surface of the quantum dots having a crystal structure in a specific direction; and binding a ligand to the exposed surface, wherein energy level of the nanomaterial is different depending on the ratio of the exposed surface or an amount of the ligand, wherein the energy level is adjusted by an electronegativity difference between the exposed surface and the ligand, wherein the ratio of the exposed surface in the specific direction of the quantum dots having the crystal structure is controlled by adjusting a growth of a crystal through a method of stabilizing a surface energy by binding an arbitrary ligand to a surface which is wanted to be exposed and destabilizing the surface energy by binding an arbitrary ligand to a surface which is not wanted to be exposed while supplying a monomer, which is a constituent material of the quantum dots, and wherein the quantum dots are formed of two or more components, and the exposed surface is formed of one component.

2. The manufacturing method of claim 1, further comprising performing an operation of exchanging the ligand with other ligands.

3. The manufacturing method of claim 1, wherein the ligand includes an ion or molecule selected from the group consisting of an amine-based ligand, a thiol-based ligand, a phosphine-based ligand, a phosphine oxide-based ligand, and combinations thereof.

4. The manufacturing method of claim 2, wherein the other ligands include a ligand selected from the group consisting of F, Cl, Br, I, 3-mercaptopropionic acid, ethanedithiol, and combinations thereof.

* * * * *